United States Patent
Tittle

[15] 3,679,757
[45] July 25, 1972

[54] PREPARATION OF PERFLUOROALKYL IODIDES

[72] Inventor: Barry Tittle, Runcorn, England

[73] Assignee: Imperial Chemical Industries Limited, London, England

[22] Filed: Nov. 24, 1969

[21] Appl. No.: 879,624

Related U.S. Application Data

[63] Continuation-in-part of Ser. No. 813,737, April 4, 1969, abandoned.

[30] Foreign Application Priority Data

April 24, 1968 Great Britain.....................19,426/68

[52] U.S. Cl..........................260/653.1 T, 260/653, 260/440
[51] Int. Cl........................................C08f 3/32, C07c 19/08
[58] Field of Search..........................260/653.1, 653.1 T, 653

[56] References Cited

UNITED STATES PATENTS 3,132,185   5/1964   Parsons..................................260/653

FOREIGN PATENTS OR APPLICATIONS 1,130,815   10/1968   Great Britain.........................260/653

*Primary Examiner*—Daniel D. Horwitz
*Attorney*—Cushman, Darby and Cushman

[57] ABSTRACT

Perfluoroalkyl iodides $C_2F_5(C_2F_4)_nI$, where n is zero or an integer equal at least to one, are made by heating perhaloalkyl arsines with iodine or with iodine and tetrafluoroethylene at temperatures from 40° – 280° C and pressures from atmospheric up to about 30 atmospheres. The preferred reaction is that between monofluorobis (pentafluoroethyl)arsine, iodine and tetrafluoroethylene at 50°– 280° C and under pressures from 5 to 30 atmospheres.

4 Claims, No Drawings

3,679,757

PREPARATION OF PERFLUOROALKYL IODIDES

This is a continuation-in-part of Ser. No. 813,737, filed Apr. 4, 1969, now abandoned.

This invention relates to a novel process for the preparation of perfluoroalkyl iodides particularly those having the empirical formula $C_2F_5(C_2F_4)nI$ where $n$ can be 0 or an integer equal to 1 or more.

Some of these perfluoroalkyl iodides are known compounds that are useful as intermediates in the preparation of surfactants and textile assistants for imparting oil- and water-repelling properties to textiles and fibers. It is known to make them by telomerization of tetrafluoroethylene with the telogens pentafluoroethyl iodide or iodine monofluoride. Both telomerizations involve the use of elementary fluorine to prepare iodine pentafluoride, from which iodine monofluoride is made by reaction with iodine, and the other telogen pentafluoroethyl iodide by the additive reaction of iodine monofluoride with tetrafluoroethylene.

We have now discovered a process for making perfluoroalkyl iodides from perhaloalkyl arsines that does not directly require elementary fluorine, nor indirectly require more than minor amounts of fluorine in the preparation of the antimony pentafluoride, that is used as catalyst in making the perfluoroalkyl arsines. The perfluoroalkyl iodides made by the process have molecular weights spread over a narrower range than that of the perfluoroalkyl iodides made by the known telomerization reactions.

The invention thus provides a process for making perfluoroalkyl iodides having the empirical formula $C_2F_5(C_2F_4)nI$, where n is zero or an integer equal to at least one, comprising heating a perhaloalkyl arsine, selected from monofluorobis(pentafluoroethyl)arsine, monoiodobis(pentafluoroethyl)arsine and tris(pentafluoroethyl)arsine, with iodine or with iodine and tetrafluoroethylene.

The monofluorobis(pentafluoroethyl)arsine $F(C_2F_5)_2As$ which is a novel compound, and the known tris(pentafluoroethyl)arsine $(C_2F_5)_3As$ are conveniently made by reactions between tetrafluoroethylene and arsenic trifluoride in the presence of antimony pentafluoride as catalyst. For example arsenic trifluoride (50 mls) and antimony pentafluoride (19 g.) were placed in a 250 mls stirred autoclave and then tetrafluoroethylene gas was introduced. A rapid exothermic reaction took place and the rate of addition of tetrafluorethylene was adjusted to keep the reaction temperature below 45° C. The reaction was over in 25 minutes and the liquid contents of the autoclave were distilled to give 176 g. of a fraction boiling at 59°–62° C. and 35 g. of one boiling at 90°–95 C. The first fraction was redistilled to give a product boiling at 61° C. and identified by determinations of C, F and As as having the empirical formula $AsC_4F_{11}$. Nuclear magnetic resonance measurements ($F^{19}$) confirmed the structural formula to be $F(C_2F_5)_2As$. The fraction boiling at 90°–95° C. was re-distilled to give a product boiling at 94° C and identified as $As(C_2F_5)_3$.

When monofluorobis(pentafluoroethyl)arsine is treated with iodine alone pentafluoroethyl iodide and monoiodobis(pentafluoroethyl)arsine are the main products. This reaction may be carried out under autogenous pressure in an autoclave at a preferred temperature of 40°–200° C or the reactants may be stirred under reflux at atmospheric pressure. When monofluorobis(pentafluoroethyl)arsine, iodine and tetrafluoroethylene are heated together in an autoclave a mixture of telomers of tetrafluoroethylene and pentafluoroethyl iodide is produced. This reaction is conveniently carried out in the temperature range 50°–280° C and under pressures of the order of 5–30 atmospheres. Similar products are obtained when monoiodobis(pentafluoroethyl)arsine is heated with tetrafluoroethylene or with a mixture of tetrafluoroethylene and iodine. The temperature range at which this reaction may be carried out is 100°–250° C and the pressure is of the order of 5–30 atmospheres. Arsenic triiodide formed during the reaction can be removed from the products by washing with aqueous potassium iodide and the various perfluoroalkyl iodides may then be separated by fractional distillation.

Tris(pentafluoroethyl)arsine may be heated with iodine and tetrafluoroethylene to yield a mixture of telomer iodides but the preferred reaction mixture is that described above using monofluorobis(pentafluoroethyl)arsine, iodine and tetrafluoroethylene.

The invention is illustrated by the Examples but its scope is not restricted by them.

EXAMPLE 1

Monofluorobis(pentafluoroethyl)arsine, $F(C_2F_5)_2As$, (35g.) and iodine (28 g.) were heated together in a 300 ml. autoclave at 100° C for 1 hour. The principal volatile product was pentafluoroethyl iodide b.pt. 12° C and there remained in the autoclave monoiodobis(pentafluoroethyl)arsine and arsenic triiodide. The arsine was identified by nuclear magnetic resonance and mass spectrometry.

EXAMPLE 2

Monofluorobis(pentafluoroethyl)arsine (67 g.) and iodine (51 g.) were heated in an autoclave to 100° C for 1 hour. The autoclave was cooled and from it was obtained pentafluoroethyl iodide (34g.) and monoiodobis(pentafluoroethyl)arsine (37 g.) b. pt. 118°–119° C.

EXAMPLE 3

Monofluorobis(perfluoroethyl)arsine (25 g.) and iodine (9 g.) were stirred under reflux for 3 hours. Volatile material, identified as pentafluoroethyl iodide (20 g.) which formed during the reaction was collected in a cold (−78° C) trap. The liquid product (5 g.) was filtered free from arsenic triiodide and found to be mainly monoiodobis(pentafluoroethyl)arsine.

EXAMPLE 4

Tris(pentafluroethyl)arsine, $(C_2F_5)_3As$, (35 g.) and iodine (21.4 g.) were heated in a 300 ml. autoclave at 100° C for 1 hour and then cooled. Tetrafluoroethylene was then introduced to a pressure f 250 lb/sq. in. gauge and the reactants heated to 225° C for 4 hours over which time the pressure fell to atmospheric. Distillation of the mixture of reaction products gave

| | |
|---|---|
| $C_2F_5I$ b.pt. | 12° C |
| $C_2F_5(C_2F_4)_2I$ b.pt. | 66°–68° C |
| $C_2F_5(C_2F_4)_3I$ b.pt. | 116°–119°C |

EXAMPLE 5

Monofluorobis(pentafluoroethyl)arsine (35 g.), iodine (28 g.) were heated in a 300 ml. autoclave at 100° C for one hour and then cooled. Tetrafluoroethylene was then introduced up to a pressure of 140 lb/sq.in. gauge and the temperature raised to 230° C for 4 hours after which the system was cooled, tetrafluoroethylene again introduced and the temperature raised to 230° C for a further 6 hours. The total pressure-drop was 200 lb/sq.in. Distillation of the reaction products yielded $C_2F_5I$, $C_2F_5(C_2F_4)_2I$ and $C_2F_5(C_2F_4)_3I$.

EXAMPLE 6

Monofluorobis(pentafluoroethyl)arsine (275 g.), iodine (95 g.) and tetrafluroethylene were introduced into a 1000 ml. autoclave to a pressure of 220 lb/sq.in. gauge and heated at 210° C for 6 hours. The reaction mixture was then cooled, tetrafluoroethylene introduced to a pressure of 190 lb/sq. in. gauge and the temperature raised to 210° C for 3½ hours. The reaction mixture was cooled for the second time and tetrafluoroethylene again introduced to a pressure of 70 lb/sq.in. gauge and the mixture heated for 5 hours at 210° C. After cooling arsenic triiodide was washed from the products with aqueous potassium iodide and the mixture of perfluoroalkyl iodides distilled or sublimed to give 370 g. of products distributed as follows:

| | |
|---|---|
| $C_2F_5I$ | 30.0 % by weight |

| | |
|---|---|
| $C_2F_5(C_2F_4)I$ | 11.8 |
| $C_2F_5(C_2F_4)_2I$ | 14.5 |
| $C_2F_5(C_2F_4)_3I$ | 5.9 |
| $C_2F_5(C_2F_4)_nI$ | 32.3 where $n$ equal 4 and more. |

EXAMPLE 7

Monoiodobis(pentafluoroethyl)arsine (79 g) was heated in an autoclave to 220° C for 2½ hours in an atmosphere of tetrafluoroethylene (220 p.s.i. gauge at room temperature). During the reaction period a pressure drop of 110 p.s.i. occurred. The cooled reaction vessel was vented and the liquid contents (80 g.) were poured from it. Examination of these showed them to be a mixture of $C_2F_5I$, $C_2F_5(C_2F_4)I$ and $C_2F_5(CF_2)_2I$ and starting material.

EXAMPLE 8

Monoiodobis(perfluoroethyl)arsine (68 g.) and iodine (20 g.) were sealed in an autoclave which was pressurized with tetrafluoroethylene to 250 p.s.i.g. and heated to 220° C for 2½ hours. The products consisted mainly of $C_2F_5I$, $C_2F_5(C_2F_4)I$ and $C_2F_5(C_2F_4)I$ and starting material.

What is claimed is:

1. A process for making perfluoroalkyl iodides having the empirical formula $C_2F_5(C_2F_4)_nI$, where $n$ is zero or an integer in the range 1–4, comprising heating a reaction mixture comprising a perhaloarsine selected from monofluorobis (pentafluoroethyl)arsine, monoiodobis (pentafluoroethyl)arsine and tris(pentafluoroethyl)arsine tetrafluoroethylene and iodine.

2. A process as claimed in claim 1 in which the reaction temperature is 50°–280° C and the reaction pressure 5 to 30 atmospheres.

3. A process as claimed in claim 2 in which the perhaloarsine is monofluorobis(pentafluoroethyl)arsine.

4. A process as claimed in claim 2 in which the perhaloarsine is monoiodobis(pentafluoroethyl)arsine and the reaction temperature is 100°–250° C.

* * * * *